May 21, 1963     W. H. CRAWFORD     3,090,467
AUTOMATIC CHECKSTAND

Filed Feb. 6, 1959     5 Sheets-Sheet 1

INVENTOR.
WAYLAND H. CRAWFORD
BY
ATTORNEY

May 21, 1963

W. H. CRAWFORD 3,090,467

AUTOMATIC CHECKSTAND

Filed Feb. 6, 1959

INVENTOR.
WAYLAND H. CRAWFORD
BY
Reed C Lawlor
ATTORNEY

May 21, 1963 W. H. CRAWFORD 3,090,467
AUTOMATIC CHECKSTAND
Filed Feb. 6, 1959 5 Sheets-Sheet 3

INVENTOR.
WAYLAND H. CRAWFORD
BY
Red Lawlor
ATTORNEY

May 21, 1963
W. H. CRAWFORD
3,090,467
AUTOMATIC CHECKSTAND
Filed Feb. 6, 1959
5 Sheets-Sheet 4
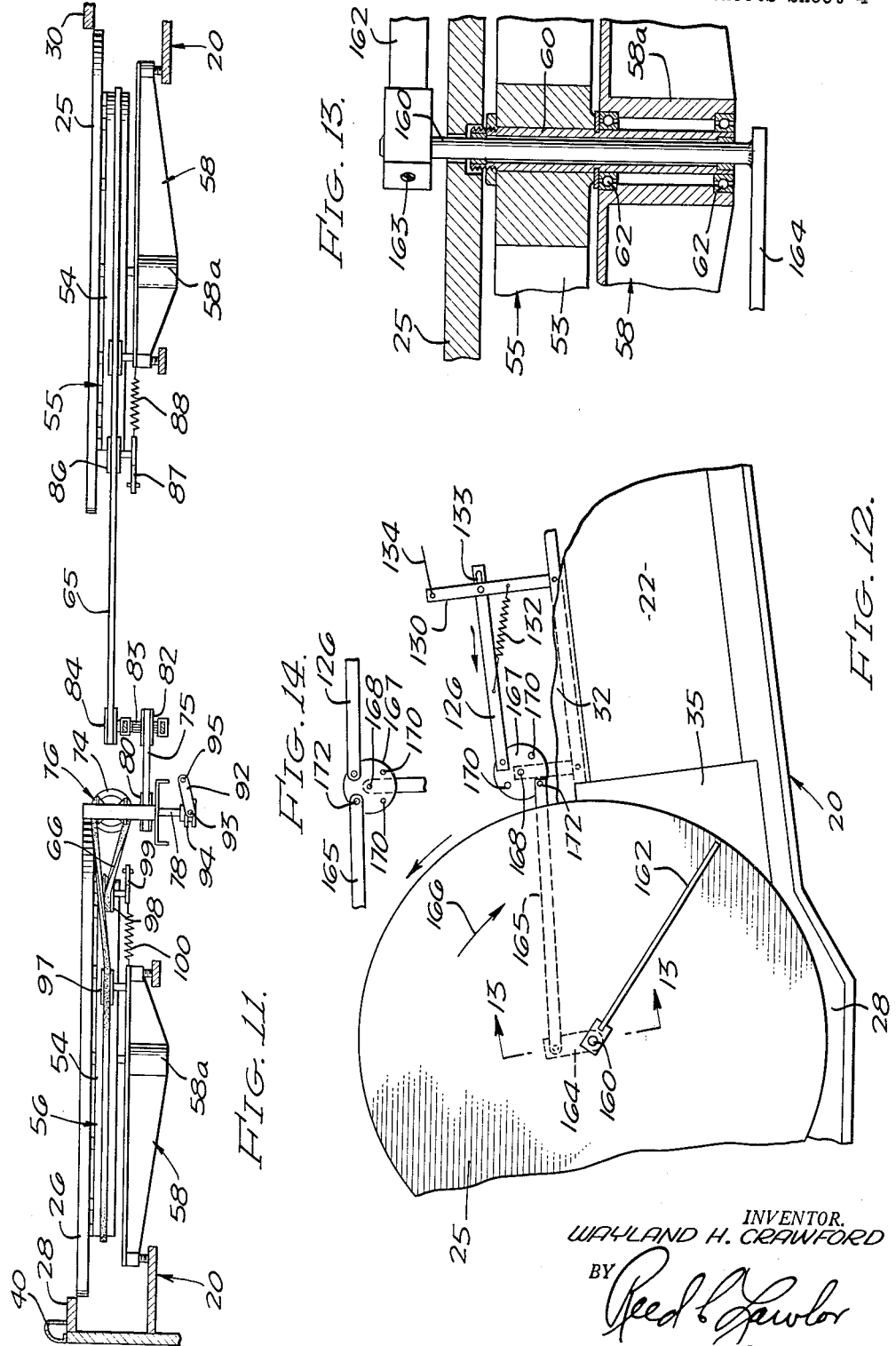
INVENTOR.
WAYLAND H. CRAWFORD
BY
Reed C. Lawlor
ATTORNEY May 21, 1963 W. H. CRAWFORD 3,090,467
AUTOMATIC CHECKSTAND
Filed Feb. 6, 1959 5 Sheets-Sheet 5
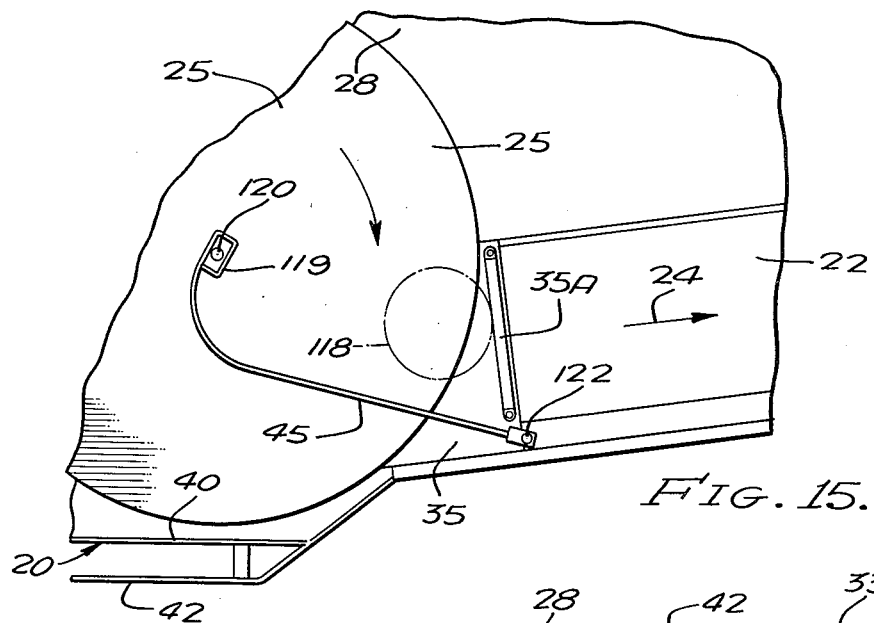
FIG. 15.
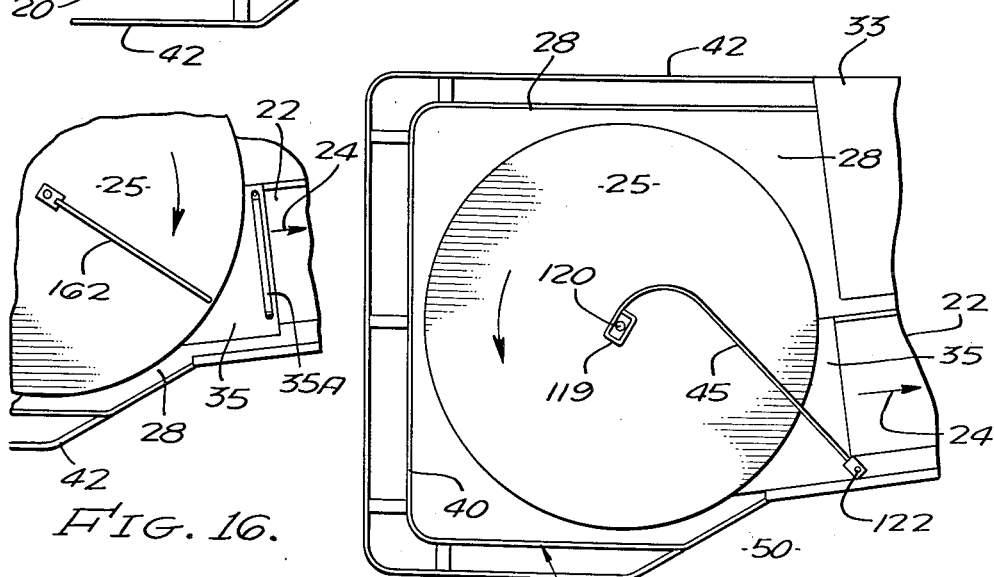
FIG. 16.
FIG. 17.
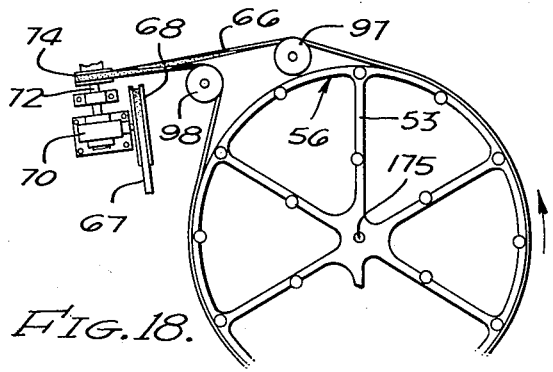
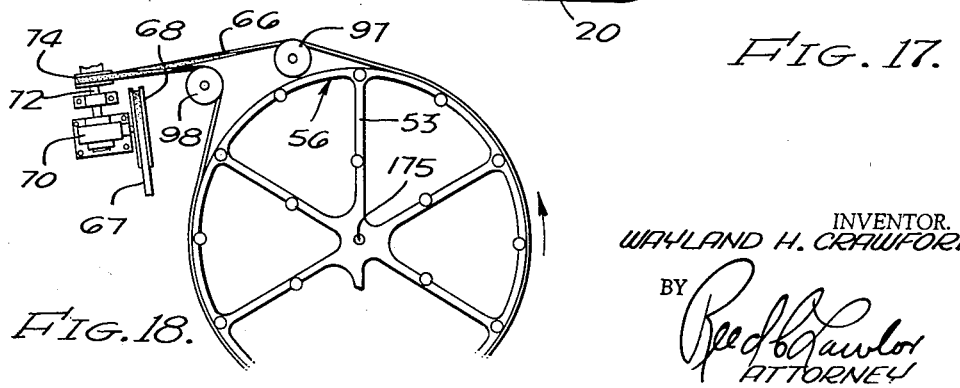
FIG. 18.
INVENTOR.
WAYLAND H. CRAWFORD
BY
ATTORNEY United States Patent Office 3,090,467
Patented May 21, 1963

3,090,467
AUTOMATIC CHECKSTAND
Wayland H. Crawford, San Gabriel, Calif., assignor to Modern Village Stores, Inc., El Monte, Calif., a corporation of California
Filed Feb. 6, 1959, Ser. No. 791,678
12 Claims. (Cl. 186—1)

This invention relates to checking counters or checking stands frequently used in self-service stores for receiving articles selected and brought to the stands by the customers and there checked out by a checking cashier or "checker."

An object of this invention is to provide for the retail merchandising industry an improved form of checkstand whereby to ease the checker's work and improve and speed the flow of goods from a receiving or unloading station of the stand, at one end, across to a sacking or packaging and delivery station at the other end of the stand and from which the checked goods are taken by the customer.

Another object of the invention is to provide a checkstand of the indicated nature which provides for the accumulation at the receiving end of the check stand of a supply of goods and their transport to the checker's position, there being provided at the opposite or delivery end of the stand means for the accumulation and handling also of a supply of goods.

An incidental object of the invention is to provide rotary table means at the opposite ends of said stand for the indicated accumulation of such supplies of goods, whereby to facilitate flow of the goods as rapidly as possible from the receiving end of the stand to the delivery end of the stand.

It is another object of the invention to provide moving transport means, such as an endless belt, between the two indicated rotary tables for passage of the goods, after handling by the checker, between the two rotary tables and to the rotary delivery table.

A still further object of the invention is to provide in connection with the rotary receiving table, means automatically actuated by goods moving with said receiving table to stop movement of such receiving table should the goods tend to accumulate thereon without checking or without transfer from the receiving table to the moving belt or the delivery table.

In many grocery stores, and similar stores, the customer collects his own goods and carts them to a checking stand of the general nature here indicated, where the goods are passed from a receiving end of the stand to a delivery end. The present invention embodies a rotary table as a part of the receiving station or counter, and another rotary table as a part of the sacking and delivery station or counter, such goods being transportable by conveyor belt means disposed between the two rotary tables so that the goods are delivered to the table at the sacking station. Thus, the customer transfers goods from a basket or cart to the rotary receiving table. The checker then removes such goods as they reach a checking position adjacent the middle of the checking counter or stand and transfers them, article by article to the belt while at the same time recording their values on a cash register tape. The belt transfers the checked articles to the rotary delivery table, whence they are removed by a sacking attendant or sometimes by the customer himself.

This present invention also includes a stop bar positioned across one side of the rotary receiving table against which the articles impinge if they have not been removed by the checker before striking the stop bar. The stop bar is connected to automatic means, such as a declutching device, for stopping rotation of the receiving table when an article on the table strikes the stop bar. Thus, the rotating receiving table is automatically deactivated until such time as the checker removes the article or articles which actuated the stop bar to deactivating position. Such control stops rotation of the receiving table, without however stopping movement of the conveyor belt or the rotating sacking table to which the checked goods have been delivered by the checker. However, a manual control may be provided for stopping movement of the conveyor belt when desired, and of course switch means or the like are provided for stopping operation of the delivery table and the whole operating system when desired.

It is also a part of this improvement to provide for reversing rotation of the receiving table in accordance with checking requirements and in accordance with the location or positioning of the check stand in the store, as may be called for by individual requirements or preference.

It is therefore a further object of the invention to provide a dual rotary table checkstand capable of reversible rotation of at least one of the rotary tables, and an additional object is to provide for automatic stopping of rotation of such table even when its direction of rotation has been changed, by the inclusion of conveniently shiftable means to accomplish such reversal and stoppage.

Other objects of the invention and various features of construction thereof will become apparent to those skilled in this art, upon reference to the following specifications and the accompanying drawings wherein there is illustrated one embodiment of the invention which is presently believed to be the best form for practicing the invention.

In the drawings:

FIG. 11 is a longitudinal elevational detail, taken from line 11—11 at the top of FIG. 4, showing the supporting and driving means for the rotary goods-carrying tables;

FIG. 12 is a fragmentary plan view showing a different arrangement for the stop bar disposed across one side of the rotary receiving table;

FIG. 13 is a fragmentary vertical section taken on the line 13—13 of FIG. 12 and showing on an enlarged scale the vertical axial mounting of the respective parts;

FIG. 14 is a detail indicating a shift when rotation of the table of FIG. 12 is to be reversed;

FIG. 15 and FIG. 16 are details of modifications usable with the structures of FIGS. 1 and 12;

FIG. 17 is a plan view of a stop bar arrangement used when the rotation of the receiving table of FIG. 1 is reversed; and FIG. 18 shows a varied drive connector to reverse rotation of the delivery table.

Figure 1:
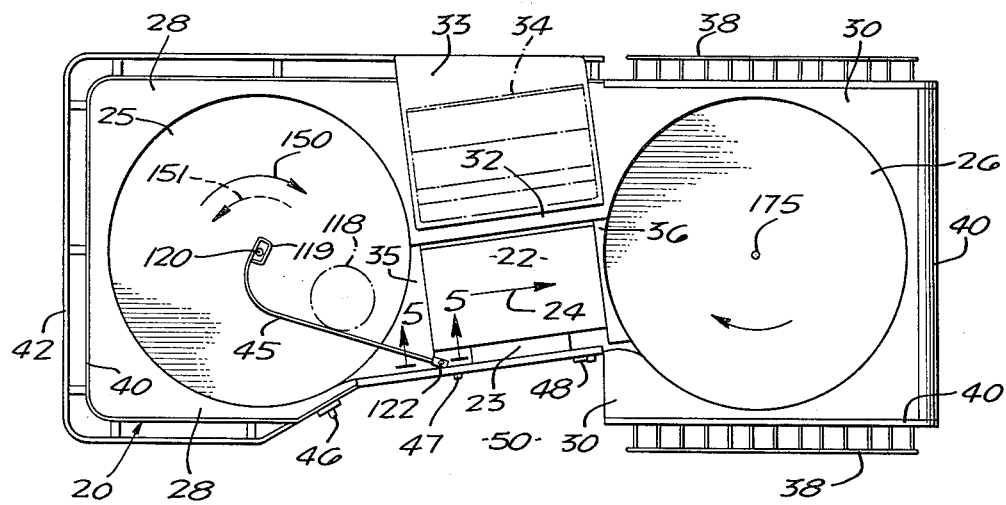
FIGURE 1 is a top plan view of the checkstand.
Figure 2:
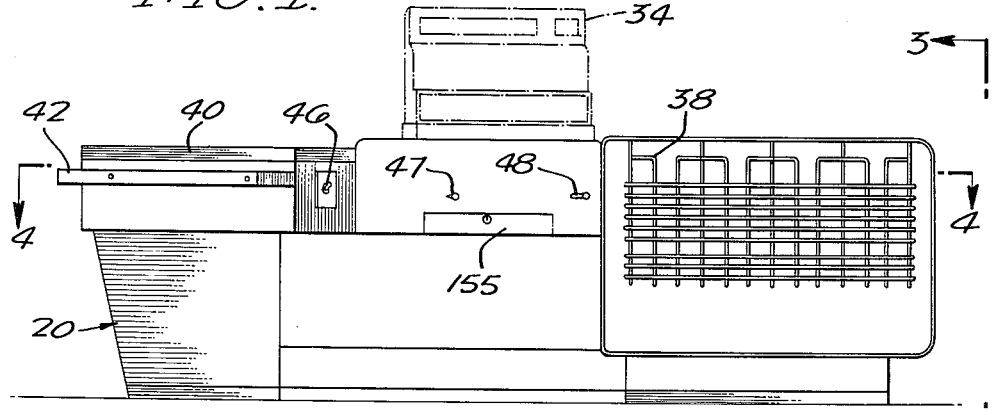
FIG. 2 is a side elevation looking into the checker's niche of the structure of FIG. 1.
Figure 3:
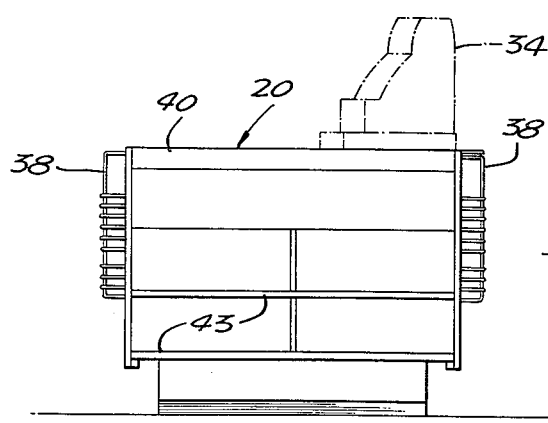
FIG. 3 is an end view at the line 3—3 of FIG. 2.

With reference first to FIGS. 1, 2 and 3, the checkstand of this invention includes internal and external framework generally indicated at 20 which carries a single movable endless conveyor belt 22 having its middle portion underlain by a rigid supporting table 23 and travelling in the direction of the arrow 24 of FIG. 1 and located at a median position between a rotary receiving table 25 at the left and a rotary sacking and delivery table 26 at the right. The receiving table 25 rotates within a stationary counter section 28 at the top of the frame 20, and the rotary delivery table 26 rotates within a stationary counter section 30 also at the top of the framework 20. As seen in the fragmentary elevation of FIG. 11, the rotary tables 25 and 26 are preferably located somewhat below the level of the counter sections 28 and 30 whereby to facilitate retention of articles on the tables 25 and 26 during rotation. In addition to the counter sections 28 and 30, there is an inter-connecting section 32 which is at the same level as the sections 28 and 30 and may, in effect, be integral therewith. In one construction, this interconnecting section 32 carries a slightly elevated base 33 for the purpose of receiving a cash register, such as indicated in broken lines 34, or the like, such as produce scales, or both, according to the arrangement and sizes of such pieces of equipment. In addition to the relatively elevated counter-sections 28, 30 and 32, there are also provided at the level of the rotary tables 25 and 26, a small feed platform 35 at the feed end of the belt 22 and adjacent to a corresponding arcuate portion of the table 25, and a narrow platform 36 at the discharge end of the belt 22 and between it and the adjacent arcuate portion of the rotary delivery table 26. Preferably, these small platforms 35 and 36 are removable and they are mounted to provide clearance fits with the respective adjacent moving parts. These small platforms 35 and 36, being on the same levels as the tops of the rotary tables 25 and 26 and the top of the endless conveyor belt 22, serve nicely for the sliding movement of checked articles by hand across to the advancing belt 22 and the pushing of such articles by the moving belt 22 across the narrow discharge platform 36 onto the rotating delivery table 26.

As also shown in FIGURES 1, 2 and 3, bag racks 38, of heavy wire or the like, are provided at the opposite sides of the present checkstand, their upper portions extending high enough, especially as seen in FIGURE 2, to act as guard rails for the stand. Additionally, appropriate guard rails 40 are provided at opposite ends of the stand to insure retention of articles on the counter sections 28 and 30, and also a bumper rail 42 is provided at the receiving end of the stand to resist impact of carts rolled up to position for transfer of grocery articles and the like onto the receiving table 25. At the opposite end of the stand, shelves 43 are desirably provided to receive large or oversize paper sacks and the like into which a very large number of articles may be packaged, such shelves being indicated in FIG. 3. As seen in FIG. 1, an automatically operating pivoted stop bar 45 extends across one side of the receiving table 25. As best seen in FIG. 2, a switch 46 is provided handly to the checker to cut off all electric energy used to power the moving parts of the checkstand, a control knob 47 also is provided handy to the checker for de-energizing the endless conveyor belt 22, and a control arm 48 is provided handy to the checker for manipulating the rotation-reversing mechanism connected with the rotary receiving table 25. These controls will be described in detail hereinafter in connection with the respective parts.

Figures 4, 5:
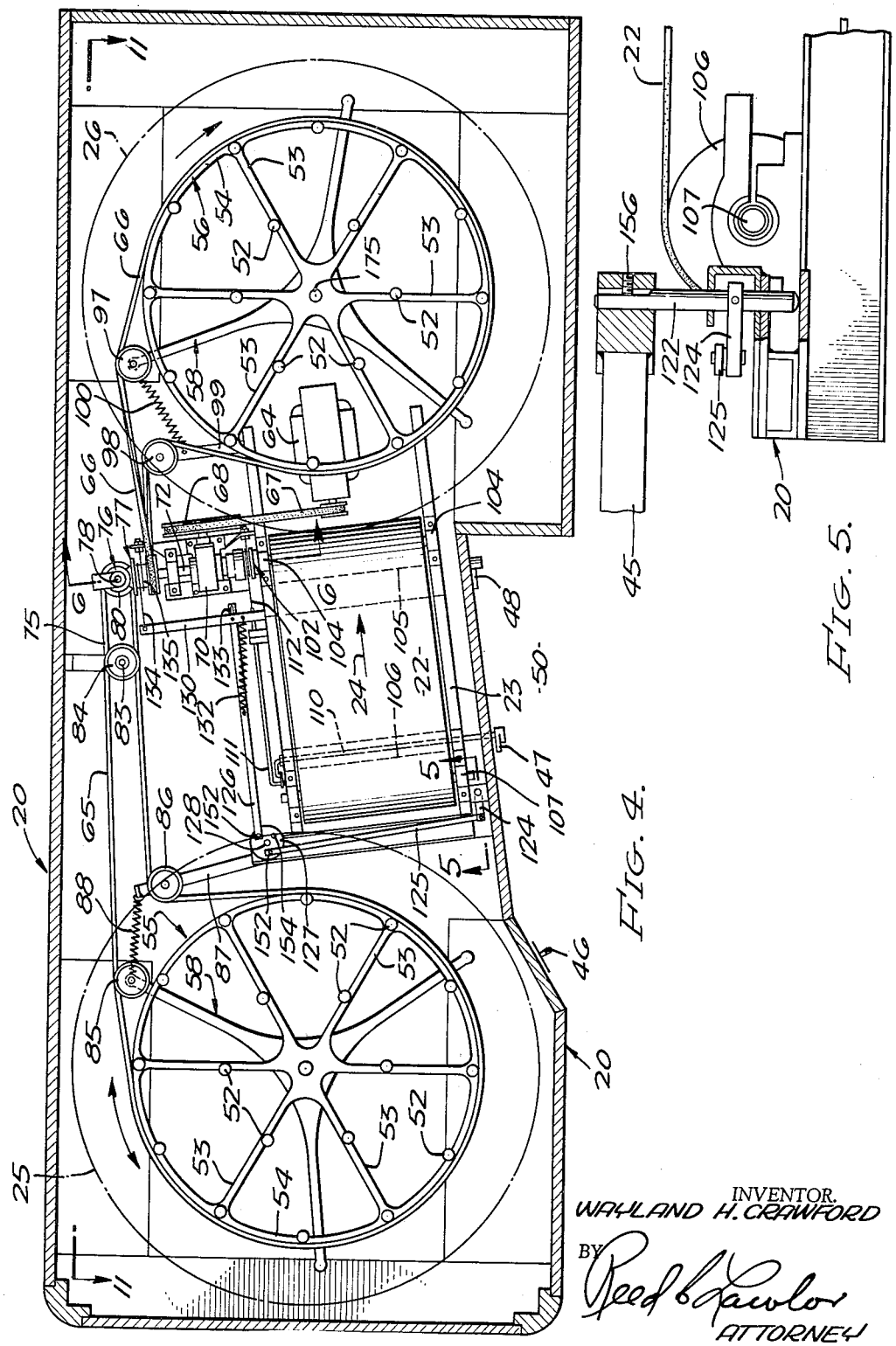
FIG. 4 is an enlarged horizontal cross-sectional view taken approximately from line 4—4 of FIG. 2 and principally below the level of the rotary tables, but showing the top surface of the conveyor belt, and also showing the supporting and driving means for the rotary tables and the belt.
FIG. 5 is a further enlarged detail of the pivoting control of the stop bar on the lines 5—5 of FIGS. 1 and 4.

As indicated in FIGS. 1 and 4, a niche or stall 50 for the checker is provided immediately behind that paneled portion of the framework 20 which carries the control manipulating elements 46, 47 and 48 which are disposed immediately behind the endless conveyor belt 22 which is in turn located immediately behind the cash register 34 or other pieces of equipment similarly employed. In addition to thus locating the checker immediately behind the conveyor belt 22, this niche locates the checker's hands between and closely adjacent the rotating tables 25 and 26.

The rotary tables 25 and 26, which are in general imperforate flat surfaces, are suitably secured to a selected number of several bosses 52 (FIG. 4) on the spokes 53 and rim or tire 54 of respective turn-table wheels 55 and 56. Each of these wheels 55 and 56 is in turn journaled in a central hub 58a of a spider 58 constituting a turn-table base and having the ends of its arms secured to adjacent portions of the framework 20 (FIGS. 4 and 11). A detailed showing of a usable mounting is shown in FIG. 13 wherein a journalling sleeve 60 and the hub of wheel 55 are rotatably mounted by ball-bearings 62 in the hub 58a of the respective spider 58.

Figure 6:
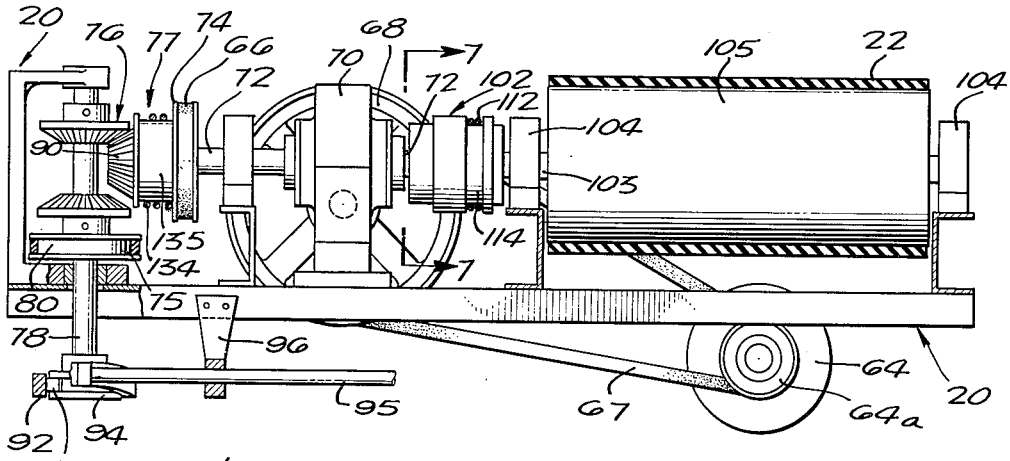
FIG. 6 is an enlarged detail approximately on the line 6—6 of FIG. 4, showing parts in vertical section and showing the power transmission principally in elevation.

In the form of construction illustrated, the tire 54 of each of the turntable wheels 55 and 56 serves as a drive face which receives a drive belt indirectly actuated from an electric motor 64 (FIGS. 4 and 6). The wheel 55 is directly driven by a belt 65 and the wheel 56 is directly driven by a belt 66. These belts 65 and 66 are driven from the motor 64 by a sheave 64a and a V-belt 67 driving a pulley 68 (FIGS. 4 and 6), which works through a gear box 70 to drive an output shaft 72. A pulley 74 on the shaft 72 directly drives the belt 66, but the belt 65 is driven by way of an intermediate belt 75 through a bevel-gear train 76 and a clutch 77 of the overriding spring-energized type illustrated in FIG. 9. The bevel gear train, which is best shown in FIG. 6, is vertically shiftable for the purpose of reversing the direction of rotation of the rotary receiving table 25 through its turn-table wheel 55, as presently to be described. Upper and lower bevel gears 76 are mounted upon a driven shaft 78 upon which is fixed a pulley 80 receiving and driving the intermediate belt 75 which in turn drives a pulley 82 mounted on a stub shaft 83 (FIGS. 4 and 11) carrying at its upper end another pulley 84 which directly drives the belt 65. The belt 65 is passed between the wheel 55 and the pulley 84 by way of a pair of idler pulleys 85 and 86, on which the pulley 85 may be mounted in a fixed position, as at the end of one arm of the respective spider 58, the other idler pulley 86 being mounted on the swinging end of a pivoted positioning arm 87 which is under the control of an adequate tensioning spring 88 maintaining take-up of slack in the belt 65.

Reversal of direction of rotation of the receiving table 25 and its wheel 55 is effected by raising and lowering the beveled gears 76 and their shaft 78, as best indicated in FIG. 6, with respect to a common cone or bevel gear 90 on the adjacent end of the output power shaft 72, whereby either gear 76 is brought selectively into driving engagement with the gear 90. Such raising and lowering is desirably effected by means of a rocking yoke 92 carrying shift pins 93 engaged in a rotating shift collar 94 fixed on the lower end of the vertical shaft 78. The yoke 92 is rocked through the medium of a rock-shaft 95 whose respective end may be positioned adjacent the shaft 78 by a bearing bracket 96. The opposite end of the rockshaft 95 projects forward to the checker's station in the niche 50, where it carries the exposed control arm 48 previously mentioned and shown especially in FIGS. 2 and 4. The various operating parts are appropriately mounted in various portions of the framework 20 as well indicated, for example, in FIG. 6.

Somewhat similarly to the mounting of the drive-belt 65, the drive-belt 66 for the rotary delivery table 26 passes from the pulley 74 on the power shaft 72 to the respective turntable wheel 54 by way of idler pulleys 97 and 98, of which the idler pulley 97 may be fixed, for example, at the end of one arm of the spider 58 mounting the respective reel, the other idler pulley 98 being positioned on the swinging end of a pivoted mounting arm 99 which is under the control of a tensioning spring 100 for the purpose of taking up slack in the belt 66.

The end of the power shaft 72 opposite from the pulley 74 and the clutch 77 is connected through another overriding spring-energized clutch 102 to a driven shaft 103 journaled at 104 and connected to drive a roller 105 which moves the endless article-carrying belt 22 disposed between the rotary tables 25 and 26, the opposite end of the belt 22 passing around a supporting idler roller 106 indicated in FIG. 4 and mounted in journals 107.

Figure 7:
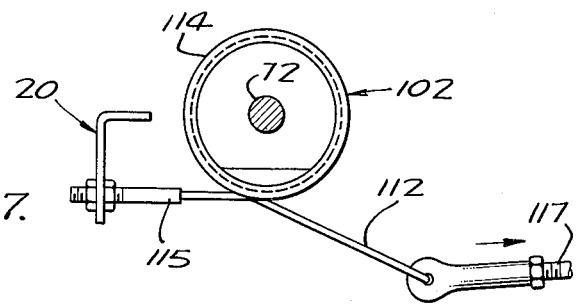
FIG. 7 is an enlarged detail taken approximately from the line 7—7 of FIG. 6 and showing, principally in elevation, the declutching means for one of the clutches employed.
Figure 8:
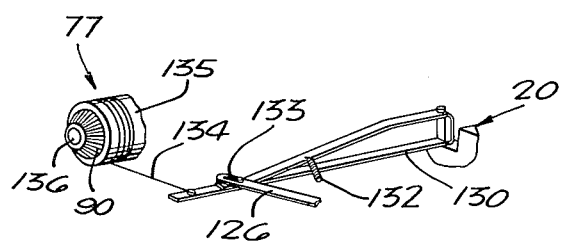
FIG. 8 is a fragmentary perspective view of control means for actuating the clutch at the left of FIG. 6.

The article transporting belt 22 is normally driven by way of its shaft 103 through the overriding clutch 102 from the power shaft 72 as above indicated, but, when desired, the clutch 102 may be released by the checker to stop movement of the belt 22. This stoppage may be effected by manipulation of the knob 47 (FIGS. 2 and 4) to move a rockshaft 110 passing below the belt 22 to impart draft to a draw bar 111 and a connected draft cable 112 which is helically wrapped around a spring-controlled drum 114 of the clutch 102, the opposite end of the cable 112 being anchored to a portion of the framework 20 as indicated at 115 in FIG. 7. As presently to be explained in connection with the actuation of the clutch 77, tightening of the cable 112 upon the drum 114 releases the clutch 102 and disconnects the drive shaft 103 for the article conveying belt 22 from the power shaft 72. Movement of the conveyor belt 22 is restored by the checker merely by turning the knob 47 to its original position.

Figure 9:
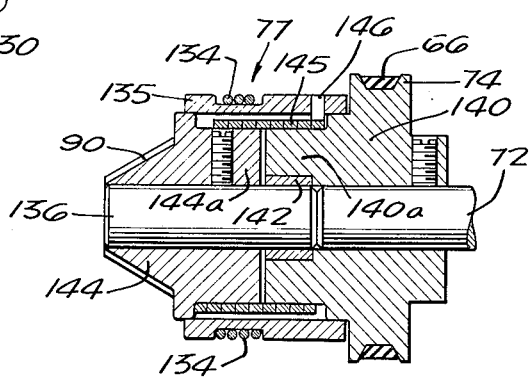
FIG. 9 is a further enlarged longitudinal sectional detail of the clutch shown at the left of FIG. 6.
Figure 10:
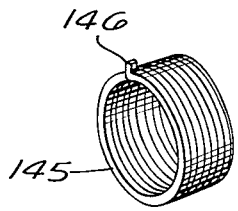
FIG. 10 is a perspective view of a coiled energizing spring employed in each of the clutches.

The clutch 77 shown in FIGS. 6 and 9 is employed for the purpose of automatically disconnecting the power shaft 72 from the bevel or cone gear 90 so as to stop operation of the receiving table 25 by way of the respective operating bevel gear 76, its driven shaft 78, the intermediate belt 75, and the driving belt 65 for the turntable wheel 55 on which the rotary table 25 is mounted.

Such stoppage of rotation of the rotary receiving table 25 is initiated by engagement of an article on the rotating table 25, such as a can 118 shown in dotted lines in FIG. 1, with the previously mentioned stop bar 45 which extends across one side of the rotary table 25 adjacent the checker's station. In this form of stop bar 45, its swinging end is formed into a loop 119 (FIG. 1) which is disposed about the projecting upper end of an axial pivot pin 120 at the center of the rotating table 25. The opposite end of the stop bar 45, as best indicated in FIG. 5, is fixed on the upper end of a vertical pivoting shaft or rod 122 which is in turn mounted on a vertical axis in an adjacent portion of the framework 20. On a lower portion of the vertical rod 122 there is fixed a swinging arm 124 (see also FIG. 4) which is pivoted at its swinging extremity to a reciprocating draft bar or pull bar 125. This is in turn connected to a pull bar 126, as through the medium of an arm or disc 127 pivoted at 128 on the frame. Draft upon the bar 125, effected by movement of the stop bar 45, imparts limited rotation to the disc 127 which in turn imparts limited draft to the bar 126. The bar 126 then operates to swing the outer end of a cross-arm 130, whose inner end is pivoted upon an adjacent portion of the framework. Actual swinging movement of the cross-arm 130 is effected through draft of the pull arm 126 upon a coil spring 132 whose opposite ends are attached to the pull arm 126 and the cross arm 130. This arrangement provides for lost motion at a pin and slot connection 133 between the arms 126 and 130 in the event of excess movement. The resultant swing of the outer end of the cross arm 130 imparts draft to a cable 134 which is helically wound around a drum 135 (FIG. 9) constituting a part of the overriding clutch 77. This cable 134 and drum 135 correspond with the cable 112 and the drum 114 of the overriding clutch 102 (FIG. 7) above described. When the cable 134 is tightened around the drum 135, the clutch is released so that the power shaft 72 is operatively disconnected from a driven stub shaft 136 to which the cone gear 90 is affixed.

Since the construction of the overriding spring-energized clutch 77 and that of the similar clutch 102 are essentially the same, the following description of the clutch 77 serves also for the clutch 102, this type being conventional. As seen in FIG. 9, the clutch 77 includes a circular driving member 140 fixed on the output or power shaft 72 and carrying in this instance the pulley 74 for the drive belt 66. The driven stub shaft 136 projects into the drive member 140 and rotates in a sleeve bearing 142 in the latter. Fixed upon the outer portion of the stub shaft 136 is a circular driven member 144 integral with the cone gear 90. The drive member 140 and the driven member 144 are provided with aligned cylindrical portions 140a and 144a respectively of reduced but equal diameters which are thereby bounded by outer collar portions of a slightly greater diameter over which the braking drum or de-energizing member 135 is disposed to enclose an underlying annular space about the two reduced cylindrical parts 140a and 144a. Within this space there is mounted a helical spring 145 of rectangular cross section. The successive turns of this spring 145 are thus laid flat upon the two cylindrical portions 140a and 144a of the drive member 140 and the driven member 144. The end of the spring 145 overlying the cylindrical portion 140a of the drive member 140 is provided with a radially extending nib 146 projecting radially into a corresponding aperture in the inner end of the drum 135 overlying the reduced cylindrical portion 140a and the adjoining collar of the drive member 140. The spring 145 is so dimensioned that when the nib 146 and the drum 135 are not constrained against rotation, the spring 145 fits snugly against the cylindrical surfaces of the two cylindrical portions 140a and 144a. With this arrangement, the drive member 140 and the driven member 144 normally rotate at the same speed. The clutch is self-energized when it is engaged, and rotation causes the spring to tighten on the cylindrical surfaces 140a and 144a of the two clutch members 140 and 144. But when the cable 134 wrapped around the drum 135 is tightened on the drum 135, rotary movement of the latter is halted. As a result, the pressure exerted by the drum 135 on the nib 146 of the spring 145 relieves the pressure of the spring 145, thus permitting drive member 140 to rotate freely within the helical spring 145, even though the rotation of the helical spring 145 has been stopped. Thus rotation of the driven member 144 and its cone gear 90 is stopped, although rotation of the drive member 140 by the power shaft 72 continues.

Consequently, by means of the clutch 77, when the article 118 in FIG. 1 strikes the stop bar 45, the clutch 77 is disengaged through the flexible cable 134, and rotation of the receiving table 25 is automatically stopped. When the stop arm 45 is released, the frictional draft of the cable 134 on the drum 135 is relieved and the clutch parts are re-engaged so that rotation of the receiving table 25 is resumed.

By these means, rotation of the receiving table 25 is readily started and stopped without affecting operation of the electric motor 64, which is the power source for the entire apparatus. The article transfer belt 22 may be stopped by the checker through manipulation of the knob 47, as when it is desired to transfer items of a subsequent order to the belt 22 for checking while an earlier order on the delivery table 26 is being sacked by an attendant.

When it is desired to reverse the direction of travel of the rotary table 25, this is accomplished by the checker by shifting the position of the control arm 48 to operate the rock shaft 95 and raise or lower the shaft 78 of the bevel gear train 76, as the case may be.

Respecting the operation of the clutch 77 to stop rotation of the receiving table 25 through the medium of the stop bar 45, and in connection with the shifting of the bevel gears 76 (FIG. 6) to reverse rotation of the table 25 when required, such reversal of rotation of the table 25 requires reversal of the direction of control operation of the stop bar 45. As previously described, the bevel gears 76 are raised through their shaft 78 from the position in FIG. 6 so that the lower bevel gear 76 is shifted to engage the bevel spur gear 90, thereby reversing the direction of rotation of the shaft 78, this being done by the checker from the small actuating arm 48 at the checker's station to rotate the rock shaft 95 and lift the shaft 78 by medium of the yoke 92. By this shift, the rotation of receiving table 25 is now changed from the clockwise direction of the solid arrow 150 of FIG. 1 to the reverse direction indicated by the broken line arrow 151. Since an article 118 rotating with the table 25, when impinging with the stop bar 45 will move the latter in the direction opposite its former movement, it becomes necessary to shift the connection of the bar 125 which formerly operated as a pull bar so that it becomes a push arm and will still rotate the mounting disc 127 to move the pull bar 126 in the same direction as formerly. This is simply accomplished by mounting the pull bar 125 on the disc 127 with a removable drop pin 152 (FIG. 4) so that the latter may be lifted, the respective end of the bar 125 shifted to another pivot hole 154, and the drop pin 152 placed in the new connecting position. Thus, when the arm 125 is converted from a pull bar to a push arm, the pull bar 126 still operates to pull the swinging arm 130 and the cable 134 to disconnect the clutch 77 in the manner previously described. Access to the drop pin 152 is easily gained by way of a door or removable drawer 155 (FIG. 2) positioned at the checker's station adjacent or between the runs of the carrier belt 22.

If the curved form of stop bar 45 shown in FIG. 1 is employed, rather than a straight radial form as seen in FIG. 12, it will be desirable to turn over the curved bar 45 to pitch its curve in the opposite direction from that shown in FIG. 1. This is readily done merely by loosening the set screw 156 (FIG. 5) which fixes the bar 45 to the top of the vertical mounting and actuating shaft 122, lifting the bar 45 from the shaft 122 and its limit loop 119 from the axial pin 120 at the center of the table 25, inverting the bar 45, replacing it, and restoring the set screw 156. With this arrangement the impingement of a can 118 or other article against the stop bar 45 when rotating with the table 25 in the direction of the broken arrow 151 of FIG. 1, will cause the clutch 77 to be operated in the same manner as when the table 25 was rotating in the direction of the full-line arrow 150. This arrangement is shown in FIG. 17.

Sometimes it may be desirable to pivot the stop bar at the axis of the receiving table 25 as indicated in FIG. 12. This requires substituting a vertical rock shaft 160 (FIG. 13) for the pin 120 of FIG. 1. This shaft 160 is passed through the mounting sleeve 60 of the turntable wheel 55 which is thereby rotatably mounted on the spider 58, and the pivoted end of a radial stop bar 162 is fixed on the top of the shaft 160, as by means of a set screw 163. The lower end of the shaft 160 extends below the hub 58a of the spider 58, where a short swinging actuating arm 164 is pivotally connected to a push bar 165 (FIG. 12) which acts, when the table 25 rotates in the direction of the arrow 166, to rotate a pivoted link or disc 167 so that such disc 167 pulls the adjacent end of the previously described pull bar 126 (seen also in FIG. 4), whereby to apply draft to the swinging arm 130 and the cable 134 to actuate the clutch 77 in the same manner as previously described.

With this general arrangement of the stop bar 162, should it become necessary to reverse the rotation of the table 25 from the direction indicated by the arrow 166, a shift in the connection of the push bar 165 to the pull bar 126 becomes necessary. By having the linkage between the bar 165 and the bar 126 in the form of the disc 167 to match the disc 127 of the other form, such disc 167 being pivotally mounted at 168 and having extra holes 170, by making the pivot between the disc 167 and one of the bars 126 and 165 in the form of a drop pin 172, the push connection by way of the disc 167 is quickly converted into a pull connection merely by shifting the drop pin 172 from the position of FIG. 12 to the position of FIG. 14.

By the various means above described, it is possible quickly to stop the rotation of the article conveyor belt 22 through the medium of the knob 47, and to reverse the direction of rotation of the receiving table 25 through the medium of the short arm 48 at the checker's station, the rock shaft 95, the yoke 92 and the bevel gears 76 on their shaft 78 one of which is engaged with the conical gear 90. Also, since reversal of the direction of rotation of the receiving table 25 effects the reversal of the direction of movement of the stop bar 45 of FIG. 1 or the stop bar 162 of FIG. 12, it is relatively simple to shift the connection with the pull bar 126 in each of the forms of FIGS. 4 and 12, simply by shifting the drop pin 154 or 172 used with the disc linkage 127 or 167.

Another important structural arrangement exists in the angular disposition of the article carrier belt 22 with respect to the checker station 50 and the axes of rotation of the rotary receiving table 25 and the rotary delivery table 26. As best seen in FIGS. 1 and 4, the longitudinal median line of the article carrier belt 22 is angled toward the checker's left hand about 8° from the line through the axes of the tables 25 and 26. This arrangement results in the performance of two functions, one of which is to stop the articles striking the stop bar 45 of FIG. 1 or the stop bar 162 of FIG. 12 close to the checker's left hand, and the second of which is to place the receiving end of the carrier belt 22 close to the checker's left hand, so that a minimum of reaching is required by the checker to transfer the can 118 or other article from a position against the stop bar to the immediately adjacent end of the moving carrier belt 22. With this arrangement the median longitudinal line of the carrier belt 22 is aligned with the axis 175 of the delivery table 26. This apparently minor angular deviation is in fact of much significance to the checker and materially reduces the strain and fatigue upon the checker. In addition to bringing the checker's left hand as close as possible to the left end of the carrier belt 22 and to the stop bar 45 or the stop bar 162, the arrangement serves to face the checker more directly to the articles approaching and reaching the stop bars. This facilitates observing the articles to be handled in addition to facilitating the transfer of such articles by the checker from the receiving table 25 to the carrier belt 22. Since the cash register 34, or similar piece of equipment at the other side of the carrier belt 22, is disposed at the same angle as the belt 22 as seen in FIG. 1, and since the cash register 34 or a similar piece of equipment is placed at the usual elevation, the customary relation between the checker's right arm and such piece of equipment remains unchanged.

Further by employing a rotary table at both ends of the checkstand, with a conveyor belt 22 between the tables, a maximum of mechanical conveying is provided for all three of the parties directly involved, namely, the customer who brings the articles to the receiving table 25, the checker who handles the articles and moves them to the conveyor belt 22, and the sacker who takes the articles from the rotary delivery table 26. However, it may sometimes be required or desirable that the delivery table 26 be rotated in a counter-clockwise direction, i.e., opposite from that indicated in FIGS. 1 and 4. For that purpose, the drive belt 66 will be turned over at the pulley 74 during assembly, as is shown in FIG. 18.

Another important variation which may be required for some purchasers involves the manner of handling the goods reaching the stop bar 45 of FIGS. 1 and 17. Thus, where utmost speed is required, the arrangement indicated in FIG. 1 is employed. Here, the top surface of the receiving table 25, the top surface of the small feed platform or counter segment 35, and the top surface of the article conveyor belt 22 may be flush. With this arrangement, the checker may reach out with his left hand and, at one time, encompass several articles approaching the stop bar 45 or engaging such stop bar, and then push the whole group onto the moving belt 22 which promptly transfers them to the delivery table 26 and to a sacking attendant there. This makes for speed, although it poses the problem that an article or two in such a group being moved as a unit by the checker's left hand may not be noted and rung up on the register.

Where utmost speed is to be sacrificed to accuracy (and greater profit), the problem may be solved by either of the expedients shown in FIGS. 15 and 17. Where the receiving table 25 is to be rotated clockwise as indicated in FIG. 1, an upstanding stop bar or riser 35A seen in FIG. 15 is affixed to the upper surface of the small platform 35 lengthwise thereof and transverse of the path of the articles being transferred. This arrangement prevents pushing of an article across the platform 35, and necessitates lifting of each article across the riser 35A, whereby more certainly to insure registering the price of the article, such as the can of goods 118. Some stores may insist upon this precaution. This same riser 35A may be adopted with the form of FIG. 12, as shown in FIG. 16.

Other store owners may prefer that the receiving table 25 be rotated counter-clockwise, as indicated by the broken arrow 151 of FIG. 1, so that the goods approach the checker and accumulate on the nearest portion of the table 25, in which case the stop bar 45 is positioned as shown in FIG. 17. With this arrangement, the stop bar 45 performs both its former function and the function of the riser 35A, and requires the checker to lift each article over the bar 45 and positively place it on the conveyor belt 22. This almost certainly insures recording the charge on the conventional cash register tape. This condition will exist also with the stop bar 162 in the structure of FIG. 12 when connected as in FIG. 14 to rotate in the direction of the arrow of FIG. 14.

Though the invention has been described with reference to certain specific forms thereof, it will be obvious that the invention is not limited to those forms, but is capable of being embodied in many other forms. It will be understood, therefore, that various changes which will now suggest themselves to those skilled in the art may be made in the material, shapes, details of construction, and arrangements of the elements without departing from the invention as defined by the claims.

The invention claimed is:

1. In combination in a checkstand:
an elongated frame;
a rotary receiving table at a receiving end of said frame;
a rotary delivery table at a delivery end of said frame and spaced from said receiving table;
conveyor means disposed in the space between said tables;
means for rotating said receiving table;
means for rotating said delivery table;
means for driving said conveyor means, including a driven shaft;
clutch means on said shaft;
driving means between said clutch means and said conveyor means; and
means connected with said frame for disconnecting said clutch means from said conveyor means.

2. In combination in a checkstand:
an elongated frame;
a rotatable article-receiving table located at a receiving end of said frame;
a rotatable delivery table located at a dispensing end of said frame and spaced from said receiving table;
a conveyor movable in the space between said tables;
means to move said conveyor to pass articles from said receiving table to said delivery table;
means to drive said rotatable tables;
a movable stop bar disposed across said receiving table at a position adjacent said conveyor to be engaged and energized by an article moving with said receiving table, toward said conveyor, said stop bar being disposed with respect to the direction of rotation of said receiving table to place said stop bar between such article and said conveyor; and
means connecting said stop bar with said drive means for said receiving table to stop such table with said article at said position.

3. In combination in a checkstand structure:
an elongated frame providing an article receiving end, a delivery end, and a checker's station intermediate said ends, there being on said frame adjacent said checker's station a support for checking equipment;
a rotary receiving table at said receiving end;
a rotary delivery table at said delivery end;
article transfer means between said tables to receive articles from said receiving table for delivery to said delivery table;
power drive means to drive said tables;
clutch means in said drive means controlling rotation of said receiving table, said clutch means being free from driving connection with said delivery table;
control means disposed adjacent said receiving table for actuation by an article being advanced by said receiving table;
and means actuable by said control means to actuate said clutch means for releasing said receiving table without affecting movement of said delivery table.

4. In combination in a checkstand structure:
an elongated frame providing an article receiving end, a delivery end, and a checker's station intermediate said ends, there being on said frame adjacent said checker's station a support for checking equipment;
a rotary article receiving table at said receiving end and a rotary article delivery table at said delivery end;
an article conveying belt between said tables to receive articles from said receiving table for delivery to said delivery table;
power drive means to drive said tables and said belt;
clutch means in said drive means controlling rotation of said receiving table, said clutch means being free from driving connection with said delivery table;
a movable control member disposed across said frame in position adjacent said receiving table for movement by an article being advanced by said receiving table;
and connecting means leading from said control member to said clutch means for releasing said receiving table without affecting movement of said delivery table.

5. A combination as in claim 4 wherein said power drive means includes means for reversing rotation of said receiving table without affecting drive of said conveyor belt and said delivery table.

6. A combination as in claim 4 wherein said frame and conveyor belt have median longitudinal axes disposed at an acute angle to each other, the receiving end of said belt being nearer the checker's station than the delivery end.

7. A combination as in claim 4 wherein the top surfaces of said belt and tables are substantially flush.

8. In combination in a checkstand structure:
an elongated frame providing an article receiving end, a delivery end, and a checker's station intermediate said ends, there being on said frame adjacent said checker's station a support for checking equipment;
a rotary receiving table at said receiving end and a rotary delivery table at said delivery end;
article transfer means between said tables to receive articles from said receiving table for delivery to said delivery table;
power drive means to drive said tables;
clutch means in said drive means controlling rotation of said receiving table, said clutch means being free from driving connection with said delivery table; and reversing means connected with said clutch means for changing the direction of rotation of said receiving table without affecting movement of said delivery table.

9. In combination in a check stand:
an elongated frame providing a receiving end and a delivery end;
means providing a checking station intermediate said ends;
a rotary receiving table at said receiving end;
a rotary delivery table at said delivery end and spaced from said receiving table;
conveyor means at said checking station and disposed in the space between said tables to receive articles from said receiving table, said conveyor means and tables providing top surfaces at substantially the same level;
means for driving said conveyor means to pass articles thereon to said delivery table;
drive means for rotating said receiving table;
drive means for rotating said delivery table;
a drive wheel for each of said tables;
a drive shaft;
a belt connecting said shaft with the drive wheel of said delivery table;
clutch means in said shaft;
a shaft extension beyond said clutch means;
a belt connecting said shaft extension with the drive wheel for said receiving table;
means to disconnect said clutch means to stop said receiving table;
said disconnecting means including a stop device across a portion of said receiving table to be energized by an article on said receiving table; and
draft means connecting said stop device with said clutch means.

10. In combination in a check stand:
an elongated frame providing a receiving end and a delivery end;
means providing a checking station intermediate said ends;
a rotary receiving table at said receiving end;
a rotary delivery table at said delivery end and spaced from said receiving table;
conveyor means at said checking station and disposed in the space between said tables to receive articles from said receiving table, said conveyor means and tables providing top surfaces at substantially the same level;
means for driving said conveyor means to pass articles thereon to said delivery table;
drive means for rotating said receiving table;
drive means for rotating said delivery table;
a drive shaft connected to drive said receiving table, said delivery table and said conveyor means;
article-actuated means adjacent said conveyor means engageable by moving articles to stop the latter adjacent an end of said conveyor means;
a clutch connected with said shaft; and
means connecting said article-actuated means with said clutch to stop article movement.

11. In combination in a checkstand:
an elongated frame;
a rotary receiving table at a receiving end of said frame;
a rotary delivery table at a delivery end of said frame and spaced from said receiving table;
conveyor means disposed in the space between said tables;
means for rotating said receiving table;
means for rotating said delivery table;
means for driving said conveyor means, including a driven shaft;
clutch means on said shaft;
driving means between said clutch means and said conveyor means;
means connected with said frame for disconnecting said clutch means from said conveyor means;
master drive means connected with said shaft;
second clutch means carried by said shaft in a position remote from the first-mentioned clutch means, said second clutch means being connected to drive said receiving table;
means to shift said second clutch means to disconnect said receiving table; and
drive means on said shaft connected with said delivery table for driving said delivery table.

12. A combination as in claim 11, including shiftable gear reversing means disposed between said second clutch means and said receiving table for reversing the direction of rotation of said receiving table without affecting movement of the conveyor and the delivery table.

References Cited in the file of this patent

UNITED STATES PATENTS

| | | |
|---|---|---|
| 769,947 | Kramer | Sept. 13, 1904 |
| 1,110,983 | Ayars | Sept. 15, 1914 |
| 1,224,475 | Logan | May 1, 1917 |
| 1,430,766 | Stebler | Oct. 3, 1922 |
| 2,569,711 | Foster | Oct. 2, 1951 |
| 2,625,241 | Smith | Jan. 13, 1953 |
| 2,630,202 | Saxe | Mar. 3, 1953 |
| 2,631,689 | Rubaloff | Mar. 17, 1953 |
| 2,723,728 | Crawford | Nov. 15, 1955 |
| 2,871,984 | Colman | Feb. 3, 1959 |
| 2,902,115 | McNeil | Sept. 1, 1959 |
| 2,909,020 | Mersky | Oct. 20, 1959 |